May 12, 1931.  J. O. HORTON  1,805,043
SAWING MACHINE
Filed June 5, 1930   3 Sheets-Sheet 1

Inventor
JOHN O. HORTON
By Dowell and Dowell
Attorneys.

Inventor
JOHN O. HORTON

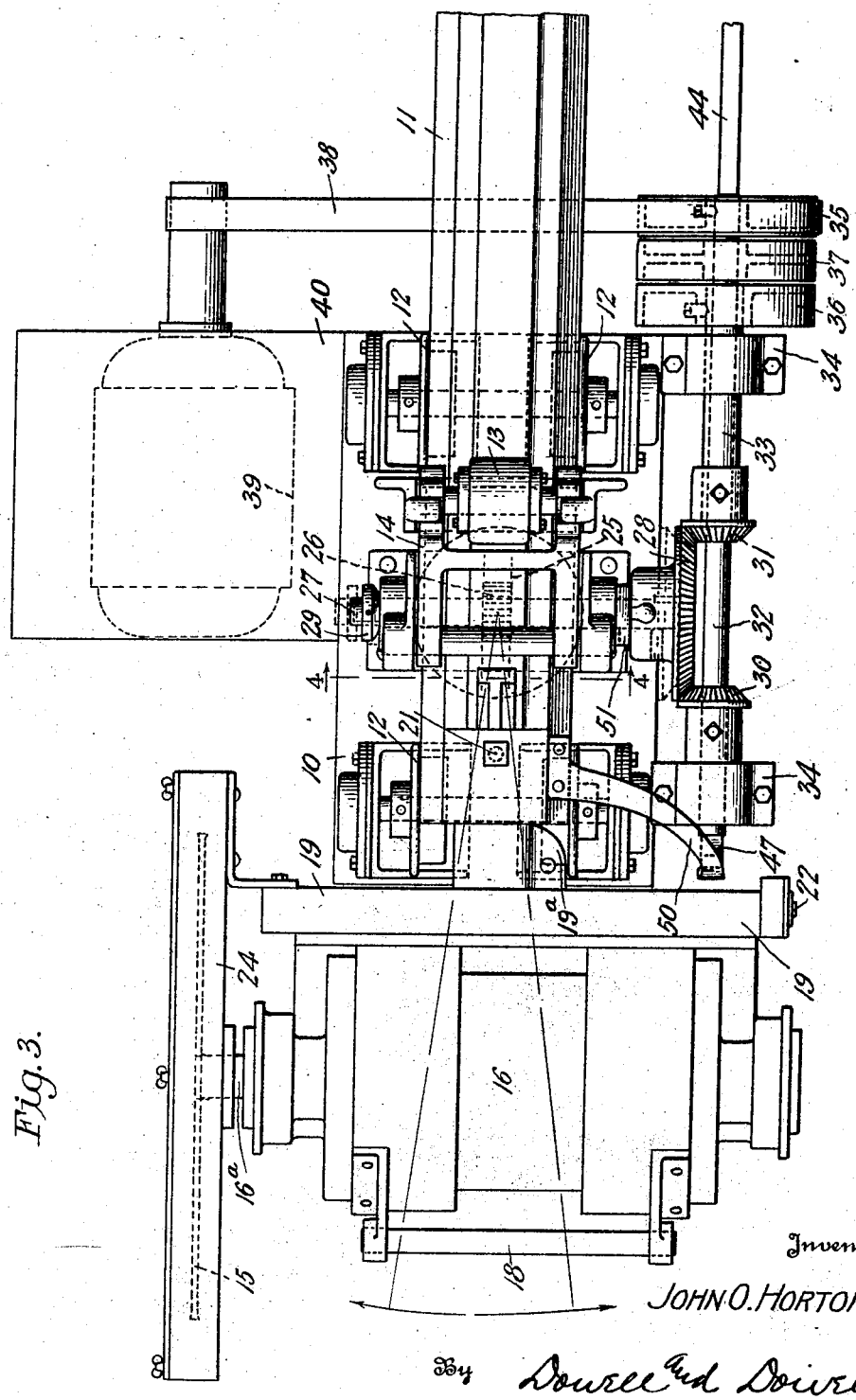

Patented May 12, 1931

1,805,043

UNITED STATES PATENT OFFICE

JOHN O. HORTON, OF MONTROSE, PENNSYLVANIA, ASSIGNOR TO BEACH MANUFACTURING COMPANY, OF MONTROSE, PENNSYLVANIA, A CORPORATION OF PENNSYLVANIA

SAWING MACHINE

Application filed June 5, 1930. Serial No. 459,355.

This invention relates to sawing machines and aims to provide an improved machine of the reciprocated saw type adapted for straight and both plain and compound mitre cutting of material. Quick and easy adjustment for angle and inclination of cut and adjustability to both hand and automatic operation are important objects of the invention.

It will be best understood by description with reference to the attached drawings illustrating one practical embodiment thereof.

In said drawings:

Fig. 3 is a plan view on enlarged scale; and

It may facilitate understanding to state at the outset that the saw is carried by a reciprocable member adapted to setting at any angle laterally to the material to be cut and rotates on a tiltable axis adapting it to inclination at any angle to the material. Thus in addition to adaptment for cutting vertically straight across and diagonally of the material, the saw blade may be positioned or arranged to make any desired inclination or bevelled cut either straight across or diagonally, the cut of course being in a straight line in the plane of the saw.

The illustrative machine embodies a base or pedestal 5 in which a supporting column 6 is supported and guided in vertical movement. This movement is effected through a hand-wheel 7 on the outer end of a shaft carrying a pinion 8 in mesh with pinion 9 on another shaft extending in threaded engagement through a lug $6^a$ on the column and so serving to raise or lower the latter (according to hand-wheel rotation) as also to support it.

The column extends upwardly through an opening at the upper end of the pedestal having a split collar $5^a$ with set-screw for binding it against slippage under weight of the parts resting upon it.

Figure 1:
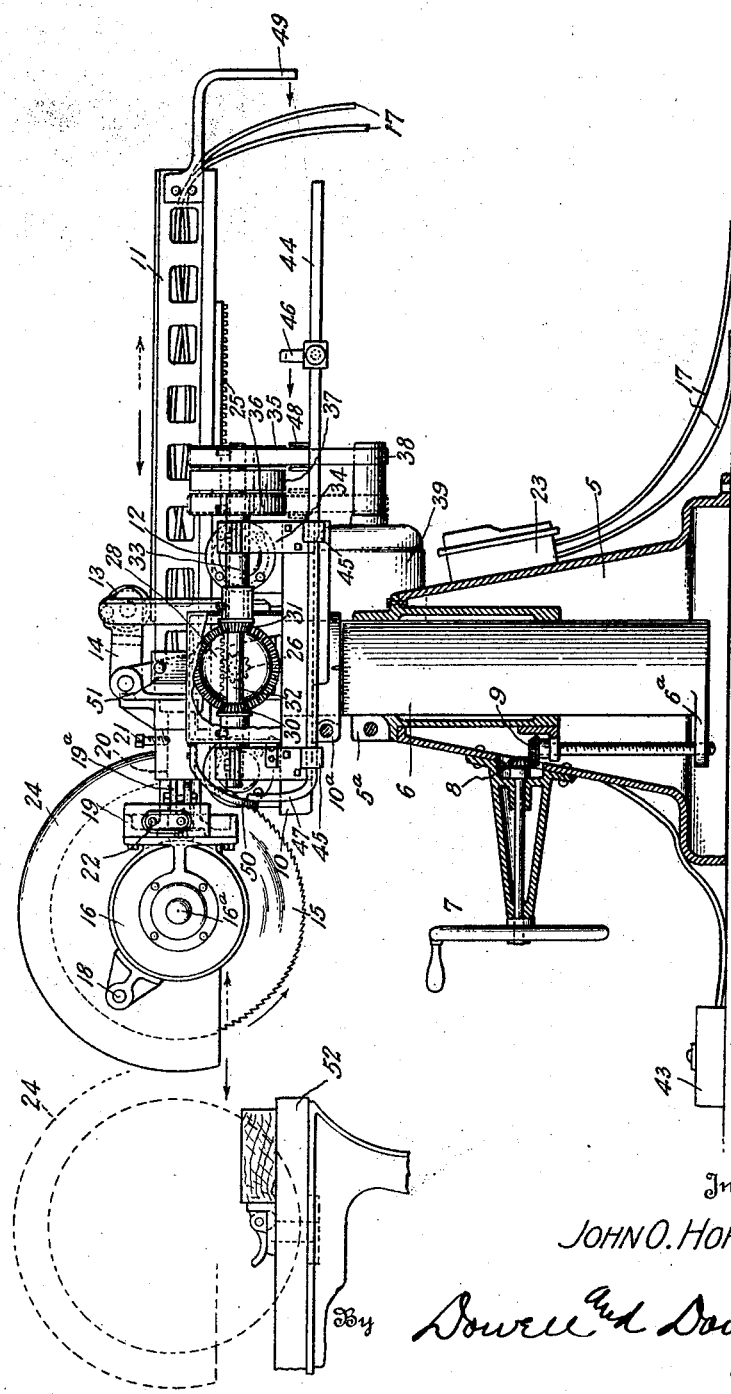
Fig. 1 is a side elevation of the machine with dotted line indication of the saw advance.

Over the top of the column is engaged a cradle member 10 adapted to swivel thereon. This member has a split collar $10^a$ with set-screw adapting it to be locked to the column in any position of turn thereon about 360°. Graduations on this last mentioned collar or on the column, with an index line or pointer on the other enable exact settings to be made at desired angle to the work. Such are represented in Fig. 1.

In said cradle member, an elongated bar or ram 11 is supported for reciprocal slide-movement between guides therefor. This bar is shown movable on rollers 12 antifrictionally journalled in the cradle member and having peripheral flanges or flange-plates serving as the guides therefor in the reciprocal movement. A roller 13, supported in a yoke 14 by upright arms or a frame portion of the cradle member, with pressure on the top of the ram serves to steady and prevent unbalancing of the latter in sliding back and forth.

The ram carries a rotatable saw-blade 15 mounted on a shaft with its axis in right-angle relation thereto. In this instance, the saw-blade shaft forms the rotor of an electric motor 16. The current conductors 17 therefor may run through the ram, formed hollow for lightening purposes, as indicated in Fig. 1. A handle-bar 18 affixed to the motor casing provides convenient means of swinging the entire unit as also of tilting the saw mounting.

The saw motor with blade on its shaft $16^a$ is adjustably mounted on the forward end of the reciprocable ram by means of a base-plate 19 having a split collar $19^a$ with set-screw fitting and binding on a projection of or from the ram. Said projection in this instance comprises a short shaft 20 held by set-screw 21 within a bore at the forward end of the ram. This mounting enables the motor base to be tilted or turned on said projection for a full 360°, the motor with blade being held at any angle or inclined position by simply tightening the set screw on the aforesaid split collar $19^a$, and the saw unit may be entirely removed from its carriage either by loosening said set-screw and withdrawing the base from the projection 20, or else by loosening the set-screw 21 and withdrawing the projection from the ram.

A controlling switch for the motor is represented at 22 on aforesaid base-plate. This switch with "On" and "Off" buttons is thus conveniently placed within reach of the operator and controls the flow of current through the conductors 17 connecting with a master switch or transformer 23 on the pedestal. It will be noted that the saw motor is supplied with current independently of the power unit for reciprocating the slidable ram or bar.

It will also be appreciated that the rotor or shaft 16$^a$ of the motor providing the mandrel for the saw-blade, may be drilled and reamed or otherwise adapted to receive a tool, such for example as a drill, should it be desired to use the machine for some other purpose than sawing. With such tool, of course, the machine may be used in the same way as with the saw-blade, i. e., it may be adapted to position the tool and reciprocate the same at any angle desired. Moreover, the reciprocal action of the ram may be interrupted to hold the tool stationary at any angle with reference to the work or material on which it is to operate. The saw of the illustrative structure is desirably shielded by a protective hood or casing 24, leaving it exposed only at the bottom for an extent sufficient to engage the work and perform its intended function.

Figure 4:
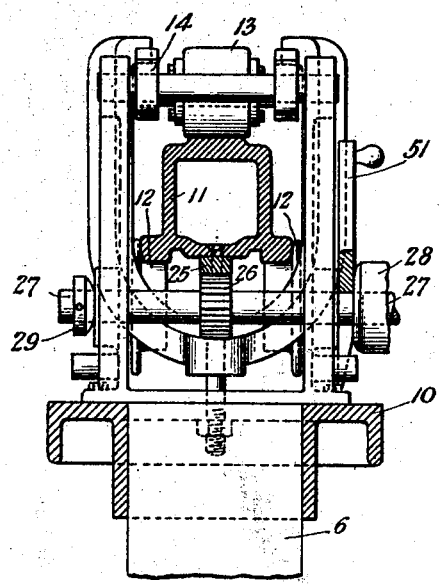
Fig. 4 is a section on the line 4—4 of Fig. 3.

The aforesaid ram is reciprocated by a novel arrangement of gears with driving means therefor. Referring more particularly to Figs. 3 and 4, the ram has a rack or rack portion 25 on its bottom engaged by a spur-gear 26 for impelling it back and forth according to the direction of rotation. This gear is splined on a shaft 27 journalled transversely of the aforesaid cradle member and adapted to slide or shift axially a slight distance in either direction for a purpose which will presently appear. Said shaft is rotated in opposite directions by a bevel gear 28 fitted on one end, which also serves to limit the axial slide movement or shift in one direction, while a collar 29 at its other end serves to limit such movement or shift in the other direction.

The said bevel gear is engageable with diametrically opposed pinions 30 and 31 mounted respectively on concentric shafts 32 and 33 in parallel relation to the sliding ram. These shafts are journalled in bearings 34 having bracket support upon the cradle member, the shaft 33 carrying the pinion 31 being formed as a hollow sleeve through which the shaft 32 carrying the pinion 30 extends rearwardly.

The concentric shafts are separately driven in the same direction from a common power source, in this instance by pulleys 35 and 36 respectively, having an idler pulley 37 therebetween. The pulley 35 is keyed or affixed by set-screw on the shaft 32 and the pulley 36 is similarly affixed on the shaft 33, while the pulley 37 may idle on either. The group arrangement of these pulleys provides for the continuous application of driving power which one or the other of the three pulleys may receive. The idling pulley between the two driving pulleys also serves to relieve the drive from the one before it is applied to the other and so eliminates the possibility of stripping the drive pinions or bevel gear as might otherwise result.

Figure 2:
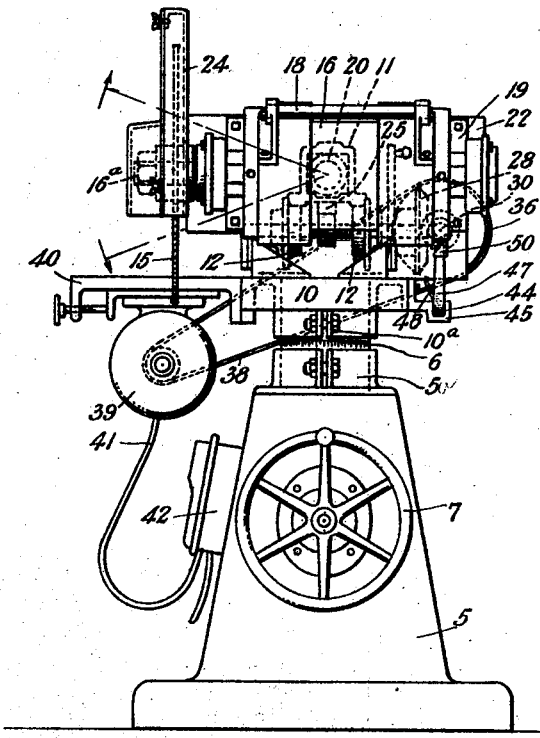
Fig. 2 is a front elevation thereof with dotted line indication of the saw's tiltability.

The driving power is imparted to these pulleys through a belt 38. The power source in this instance comprises an electric motor 39, over the extended rotor of which said belt is trained (see Figs. 1, 2 and 3). Said motor is supported by a platform extension 40 of the aforementioned cradle member and, of course, swings or turns therewith upon the supporting column. Current for this motor is supplied through conductors 41 from a master switch or transformer 42 on the pedestal and the same may be controlled by a foot-pedal 43 convenient to the foot of the operator.

From the foregoing it will be understood that the saw carriage or ram is reciprocated as the drive of motor 39 is shifted from one pulley to the other, or alternated between the pulleys 35 and 36. Assuming the drive to be in clockwise direction (as viewed from the rear of the machine), the belt in position of Fig. 3 and trained over the pulley 35 will therethrough communicate it to the shaft 32 and pinion 30, while the shaft 33 with pinion 31 and pulley 36 will be free to rotate in the opposite direction. This drive through pinion 30 will be transmitted in counter-clockwise direction to the bevel gear 28 and also to the shaft 27 and spur-gear 26 so as to move or impel the saw carriage or ram forwardly. When the drive is shifted over the pulley 37 onto the pulley 36 so as to impart the drive to the pinion 31 (whereupon the shaft 32 with pinion 30 and pulley 35 will be free to rotate in opposite direction), the bevel gear will be rotated in clockwise direction and through its shaft and spur-gear 26 will move or impel the saw carriage or ram rearwardly. Thus the carriage or ram is moved back and forth as the drive is alternated between the pulleys 35 and 36.

The forward movement of the carriage or ram is controlled by an adjustable shifter according to the desired extent or width of the material to be cut. This shifter comprises a bar 44 slidable in guides 45 on the cradle member. It carries a movable block with lateral extension 46 on one end adapted for setting at any point and providing a trip-member. Its other end is bent upwardly or formed with a lateral extension providing another trip-member 47. Intermediately it carries a yoke or fork 48 straddling the drive belt 38 and adapting the bar to function as a belt shifter.

As the saw carriage is impelled forwardly, an armpiece 49 on its rear end engages the trip-member 46 and slides the bar forwardly with its said yoke or fork moving the belt over pulley 37 onto the pulley 36, and as the carriage is impelled rearwardly, an armpiece 50 on its forward end engages the trip-member 47 to slide the bar with its yoke or fork reversely shifting the belt for alternating the drive as above described. The continuously applied drive is thus shifted automatically from one pulley to the other so as to impel the saw carriage back and forth repeatedly, so long as current is supplied to the motor 39. The extent and frequency of the saw carriage movement in opposite directions may be varied by moving the trip-member 46 to different positions on the belt shifting bar, as will be obvious.

The machine may be thrown out of automatic operation by disengaging the bevel gear 28 from its driving pinions 30 and 31. For this purpose the shaft 27 is mounted for axial movement or shift as aforesaid. A bifurcated plate 51 (see Figs. 3 and 4) adapted to straddle said shaft serves as a wedge for shifting the same with the bevel gear into and out of engagement with said pinions. In the position shown, this plate holds the gear in engagement with the pinions by wedgement between the upright wall or frame portion of the cradle member and the hub of the gear. If removed and reapplied in like position between the collar 29 and the wall or frame portion of the cradle member at its other side, it will wedge to draw the shaft with the bevel gear out of engagement with its driving pinions. By thus throwing out the automatic drive, the saw carriage may be operated by hand and the armpiece 49 will then serve as a handle for the purpose.

The described machine is adapted to cut straight across or diagonally of material, fed for example along a table 52 in lateral relation to which the machine is placed and adjustably fastened to the floor. By loosening the set-screw of the split collar 10ª of the cradle member, the entire mounting or cradle unit may be swung to any angle within 180° with respect to the material on the cutting table. After setting the ram at desired angle to the material, it will reciprocate the saw back and forth in cutting relation to the material as current is applied to apply the drive thereto. By loosening the set-screw on the split collar 19ª of the saw blade's motor base, the blade may be tilted to any angle or inclination within 180° (of another plane) with respect to the material. After setting it in tilted position, or upright, as the case may be, it will cut through the material under high-speed rotation of its driving motor controlled independently of the motor for the reciprocatory drive. If both the reciprocating carriage and the saw are adjusted in position at right angles to the material in their respective horizontal and vertical planes, the cut will, of course, be straight across. If both are disposed at an angle to the work in their respective planes, a compound mitre cut will result. An angular disposition of either will effect a plain mitre cut.

To one familiar with the art and machines of this general character, the advantages of these features will be readily apparent. The features of automatic operation and adaptability to hand operation when desired, along with the quick adjustability feature so as to obtain any desired cut, will also be recognized for their advantages, and the novelty of the machine as an improvement and advance in the art will be appreciated.

Since various changes in the form and arrangement of parts, with various combinations and sub-combinations may be made without departing from the spirit and scope of this invention, it is not intended that the same shall be limited by the appended claims to the specific construction shown and described. Furthermore, as the machine is adaptable to other uses and purposes than sawing, as hereinbefore stated, the terms "saw" and "saw-blade" as used in the claims are intended to comprehend or apply to any form of tool which may be substituted for the saw-blade of the illustrative disclosure.

Having thus described my invention, what I claim as new and desire to secure by Letters Patent of the United States is:

1. A cutting machine comprising a pedestal, a column, a cradle, a ram, a rotary cutter mounted for angular adjustment about a horizontal axis and means for rotating it mounted on the ram, together with a motor and means for reciprocating the ram operated by the motor mounted on the cradle to be angularly adjusted therewith.

2. A cutting-machine comprising a pedestal, a column therein, a cradle on the column, a ram guided on the cradle, a rotary cutter mounted for angular adjustment about the axis of the ram and means for rotating the cutter so mounted, and a motor with associated means for reciprocating the ram in the cradle angularly adjustable therewith.

3. A cutting-machine comprising a pedestal, a column therein, a cradle on the column, a ram guided on the cradle, a rotary cutter mounted for angular adjustment about the axis of the ram and means for rotating the cutter so mounted, and power means for reciprocating the ram in the cradle angularly adjustable therewith.

4. A sawing machine comprising a pedestal having a support column, a cradle turnable on said column, a ram supported in said cradle and angularly adjustable therewith, power means on the cradle for reciprocating the ram, a rotary cutter blade mounted on said ram and adapted to angular adjustment about a horizontal axis, together with means for rotating said blade.

5. A sawing machine comprising a rotatably driven cutter adjustable angularly about a horizontal axis, a reciprocable carriage on which said blade is mounted, a cradle supporting said carriage for reciprocal movement and being with the latter adjustable angularly about a vertical axis, power means on the cradle for reciprocating the carriage, and a supporting element for the cradle including a post-member about which it turns.

6. A cross-cut sawing machine comprising a rotatably driven circular saw angularly adjustable about a horizontal axis, a reciprocable carriage for the saw on which the latter is mounted with its axis in a plane at right angles to the line of the former's movement, a cradle in which said carriage is reciprocably mounted and with which the same is angularly adjustable about a vertical axis, means on the cradle for automatically reciprocating the carriage, and a supporting element for the cradle including a post-member about which it turns and with which it may be raised and lowered.

7. A cross-cut sawing machine embodying a rotatably driven circular saw mounted on a reciprocable carriage and angularly adjustable about an axis parallel to the ram's reciprocable movement, wherein the carriage and guide mounting therefor along with power means for reciprocating the same are supported to swing or turn together about an axis at right angles to the axis of carriage reciprocation.

8. In a cutting machine, a rotary cutter-blade mounted on a reciprocated element so as to be angularly adjustable about an axis parallel to the ram's movement, means rotating the blade thereon, means cradling and guiding the reciprocated element and power means reciprocating the same; said cradling and guiding means together with said element and reciprocating means therefor being turnable as a unit about an axis at right angles to the element's movement axis for angular positioning of the latter in respect to the work.

9. In a cutting machine, a rotary cutter mounted on a reciprocable carriage for angular adjustment about the axis of said carriage and means for rotating it so mounted, a cradle supporting the carriage for reciprocable movement and power means thereon for reciprocating the latter, together with means supporting the cradle with all operative parts for angular adjustment about an axis at right angles to the axis of the carriage.

10. In an automatic power-reciprocated cross-cut sawing machine, a circular saw mounted on a horizontally reciprocable carriage for angular adjustment about an axis parallel to the carriage's movement and means carried by the carriage for rotating said saw, a cradle guidably supporting the carriage together with power means for actuating the same in opposite directions and means supporting the cradle in turn-movement about a vertical axis for angular positioning of the carriage in respect to the work.

11. A cross-cut sawing machine comprising a pedestal arranged beside the path for feed of the work, a column in the pedestal adapted to be raised and lowered, a cradle supported on the column for turn movement about its axis, a carriage-member mounted for horizontal reciprocation in said cradle and turnable therewith in angular adjustment lateral to the work, a motor and associated means on the cradle for reciprocating said carriage-member, a circular saw mounted on the carriage-member for angular adjustment about an axis in its direction of reciprocation and means also carried by said member for rotating said saw independently in any angular setting.

In testimony whereof I affix my signature.

JOHN O. HORTON.